US008589399B1

(12) United States Patent
Lee et al.

(10) Patent No.: US 8,589,399 B1
(45) Date of Patent: Nov. 19, 2013

(54) ASSIGNING TERMS OF INTEREST TO AN ENTITY

(75) Inventors: Jason Lee, Forest Hills, NY (US);
Tamara I. Stern, New York, NY (US);
Gregory J. Donaker, Brooklyn, NY (US); Sasha J. Blair-Goldensohn, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/430,624

(22) Filed: Mar. 26, 2012

Related U.S. Application Data

(60) Provisional application No. 61/467,911, filed on Mar. 25, 2011.

(51) Int. Cl.
*G06F 17/30* (2006.01)
(52) U.S. Cl.
USPC .......................................................... 707/737
(58) Field of Classification Search
USPC ..................... 707/E17.083–84, 730, 741, 737
See application file for complete search history.

(56) References Cited

U.S. PATENT DOCUMENTS

| 5,930,474 A | 7/1999 | Dunworth et al. | |
| 2007/0203816 A1* | 8/2007 | Costache et al. | 705/35 |
| 2009/0193328 A1* | 7/2009 | Reis et al. | 715/231 |
| 2010/0306203 A1* | 12/2010 | Rozok et al. | 707/741 |
| 2011/0302162 A1* | 12/2011 | Xiao et al. | 707/724 |

OTHER PUBLICATIONS

Effective Product Recommendation Using the Real-Time Web by Sandra Garcia Esparza (hereafter Esparza) Michael P. O'Mahony and Barry Smith, Research and Development in Intelligence System XXVII, Springer, Dec. 3, 2010.*
Statistical Identification of Key Phrases for Text Classification by Frans Coenen (hereafter Coenen), Paul Leng, Robert Sanderson and Yanbo J. Wang, P. Perner (ed.): MLDM 2007, LNAI 4751, pp. 838-853, 2007, Spriner-Verlag Berlin Heidelberg 2007.*

* cited by examiner

*Primary Examiner* — Robert Beausoliel, Jr.
*Assistant Examiner* — Hau H Hoang
(74) *Attorney, Agent, or Firm* — Bracewell & Giuliani, LLP

(57) ABSTRACT

The subject matter of this specification can be embodied in, among other things, a method that includes identifying resources relating to an entity, where each resource includes multiple terms and is included in a corpus of resources relating to multiple entities. Candidate terms from the resources for potentially associating with the entity and a category associated with the entity are identified. A relative frequency of the candidate terms in the identified resources is compared to a frequency of the candidate terms associated with other entities. Each of the candidate terms are weighted, for example, based on a source of the candidate term and the relative frequency of the candidate term. A weighted frequency of each candidate term is calculated based on the weights, and candidate terms are selected as representative terms for the entity based on the weighted frequency.

18 Claims, 7 Drawing Sheets

ASSIGNING TERMS OF INTEREST TO AN ENTITY

TECHNICAL FIELD

This instant specification relates to identifying terms of interest for a business, location, or other entity.

BACKGROUND

Data mining involves the processing and extraction of patterns from data. Observations about form, behavior, or the nature of concepts represented by data can be used to create useful intelligence about the concepts. Many data mining processes are computationally complex, and are often performed by computer systems with access to a large collection of data (e.g., web documents or other electronic documents). Documents or other data that meet particular criteria may be referred to as a corpus, and data mining operations may be performed on the corpus to create intelligence about the corpus or about documents or other data items within the corpus. For example, structured attributes for a web document that provides information about a particular place can be analyzed to identify keywords or categories associated with the web document and/or the place. Other documents within the corpus can also be analyzed to similarly identify keywords or categories.

SUMMARY

In general, this document relates to identifying terms associated with an entity.

In general, one innovative aspect of the subject matter described in this specification can be embodied in methods that include the actions of identifying one or more resources relating to an entity, where each resource includes a plurality of terms and each resource is included in a corpus of resources relating to a plurality of entities, and identifying a plurality of candidate terms (that appear in the one or more resources relating to the entity) for potentially associating with the entity. A category associated with the entity is determined, and, for each of the candidate terms, a frequency with which each candidate term appears in the one or more resources is determined. Each of the candidate terms in the one or more resources is weighted based on at least a source of the resource that included an instance of the candidate term and a relative frequency of the candidate term, wherein the relative frequency is the frequency of the candidate term in the one or more resources relative to the frequency of the candidate term in a subset of the corpus of resources relating to entities associated with the determined category (e.g., a greater weight is assigned to candidate terms that appear with greater relative frequency in the one or more resources than in the subset of the corpus of resources). A weighted frequency of each candidate term is calculated based on the assigned weights. One or more of the candidate terms are selected as being representative terms for the entity based on the weighted frequency, and the selected representative terms are associated with the entity in a data repository. Other embodiments of this aspect include corresponding systems, apparatus, and computer programs, configured to perform the actions of the methods, encoded on computer storage devices.

These and other embodiments can each optionally include one or more of the following features. A set of related candidate terms are identified for at least a first candidate term and a frequency for the first candidate term is determined by including the frequency for the related candidate terms. The set of related candidate terms includes a term that is at least one of a plural of the first candidate term, a substantially similar semantic variation of the first candidate term, a synonym of the first candidate term, and/or a subphrase of the first candidate term. The candidate terms are identified by omitting, from the plurality of terms in the one or more resources related to the entity, a predefined set of stop words and/or by omitting, from the plurality of terms in the one or more resources related to the entity, terms that fall within one or more predefined classes of terms. Identifying the plurality of candidate terms includes omitting from the plurality of terms in the one or more resources related to the entity one or more of: terms that refer to a location of the entity; terms that are variations of a name of the entity; contact information associated with the entity; terms included in a list of stop words associated with a category associated with the entity; terms that are common in documents associated with the determined category; or temporal terms. The category includes entities within a particular geographical area near the entity. The category includes entities having a same entity type as the entity. A plurality of subsets of the corpus of resources are identified, where each subset relates to a different one of a plurality of categories associated with the entity, different representative terms are determined for the entity for each of the plurality of categories, and the selected representative terms for the entity in each of the plurality of categories are associated with the entity in a data repository. The resources include one or more of web documents relating to the entity; a database storing attributes associated with the entity; a database storing terms used to search for a web document relating to the entity; a database storing terms identifying features of neighborhoods; or a database storing terms associated with the identified category. Assigning weights to each of the candidate terms in the one or more resources further includes one or more of filtering candidate terms with a term frequency-inverse document frequency (TF-IDF) value below a TF-IDF value threshold; increasing a weight associated with candidate terms containing two or more words; increasing a weight associated with terms previously used to search for the entity; or altering a weight associated with terms used more frequently to search within a particular corpus. The candidate terms are identified by identifying terms in the one or more resources related to the entity that appear in a predetermined list of terms associated with the determined category. The selected representative terms for the entity are used to generate search results for search queries that include the selected representative terms; to display one or more of the selected representative terms in association with displaying data identifying the entity; to display suggested refinements to a search query received from a user; to generate a set of representative terms for a geographical area that includes the entity; to solicit user feedback on the entity based on the selected representative terms; or to group the entity with other entities that share one or more representative terms.

In general, another innovative aspect of the subject matter described in this specification can be embodied in methods that include the actions of identifying a set of candidate terms for potentially associating with an entity, wherein the set of candidate terms are included within one or more resources relating to the entity, and identifying at least one of an entity type category for the entity or an entity location of the entity. A frequency of each of the candidate terms in the one or more resources relating to the entity is determined. The determined frequency of each candidate term is compared to a frequency of the candidate term in resources relating to other entities having at least one of the entity type category or a location less than a threshold distance from the entity location. The comparison is used to determine a relative frequency of the candidate term for at least one of the entity type category or the entity location. One or more candidate terms are eliminated as candidates for potentially associating with the entity based on the relative frequency. One or more candidate terms are selected as being representative terms for the entity based at least in part on the determined frequency of each candidate term. Data identifying the selected representative terms for the entity as being associated with the entity is stored.

These and other embodiments can each optionally include one or more of the following features. One or more candidate terms are eliminated as candidates for potentially associating with the entity based on the relative frequency includes eliminating one or more candidate terms that fall below a threshold relative frequency. At least some of the candidate terms are grouped based on relationships between terms in the set of candidate terms to generate candidate term groups, wherein each candidate term group includes a plurality of candidate terms, and a combined frequency for the candidate term groups are determined, wherein selecting one or more candidate terms as being representative terms for the entity is based at least in part on the combined frequency of each candidate term group. One of the candidate terms in the candidate term group is selecting as representative of a candidate term group, wherein the combined frequency for the candidate term group includes a combination of the determined frequency of the plurality of candidate terms in the candidate term group. One or more candidate terms are eliminated as candidates for potentially associating with the entity based on an identified correspondence of the candidate term to one of a name or location of the entity. One or more candidate terms that are above a threshold relative frequency are eliminated. The candidate terms are weighted based on a source of each resource that includes the candidate terms.

In general, another innovative aspect of the subject matter described in this specification can be embodied in a system that includes one or more resource parsing servers, one or more term scoring servers and one or more databases. The resource parsing servers are operable to access resources including information about an entity; identify a set of candidate terms for potentially associating with the entity, wherein the set of candidate terms are included within one or more of the resources that include information about the entity; and identify at least one of an entity type category for the entity or an entity location of the entity. The term scoring servers are operable to determine a frequency of each of the candidate terms in the one or more resources relating to the entity; compare the determined frequency of each candidate term to a frequency of the candidate term in resources relating to other entities having at least one of the entity type category or a location less than a threshold distance from the entity location to determine a relative frequency of the candidate term for at least one of the entity type category or the entity location; eliminate one or more candidate terms as candidates for potentially associating with the entity based on the relative frequency; eliminate one or more candidate terms as candidates for potentially associating with the entity based on a first set of rules adapted to identify predetermined classes of candidate terms that are at least relatively unique to the entity; weight one or more candidate terms based on a second set of rules adapted to identify important descriptive terms for the entity; and select one or more candidate terms as being representative terms for the entity based on a frequency and weight of each candidate term. The databases are operable to store data identifying the selected representative terms for the entity as being associated with the entity.

These and other embodiments can each optionally include one or more of the following features. The term scoring servers are operable to eliminate one or more candidate terms as candidates for potentially associating with the entity based on the relative frequency by identifying candidate terms that are common for at least one of the entity type category or the entity location. The first set of rules are adapted to identify at least one of candidate terms describing a location of the entity; candidate terms relating to a name of the entity; or candidate terms in a predefined list of terms associated with at least one of the entity type category or the entity location. The term scoring servers are operable to weight one or more candidate terms based on at least one of: the relative frequency of the candidate term; a type of resource in which one or more instances of the candidate terms is included; stored data identifying the candidate term as being a term used to search for the entity; stored data identifying a frequency of usage of the candidate term to search within a particular corpus; or a number of words included in the candidate term. The term scoring servers are operable to weight one or more candidate terms by: identifying one or more sets of related candidate terms in the set of candidate terms; and combining a frequency of each set of related candidate terms to generate a combined frequency of the related candidate terms. The term scoring servers are operable to select one or more candidate terms as representative terms by: selecting one or more sets of candidate terms based on the combined frequency of the related candidate terms; and selecting a particular candidate term from each set of candidate terms as being a representative candidate term for the set of candidate terms.

The systems and techniques described here may provide one or more of the following advantages. The techniques can provide a list of interesting terms about an entity with little or no user input. Representative information about an entity can be generated from a wide range of sources, which may minimize the impact of inaccuracy or bias in some of the sources. New intelligence about an entity can be developed, permitting new and more efficient processing of information about the entity. Terms associated with an entity can be identified at varying levels of uniqueness. Different terms can be associated with an entity for different corpora. Terms that describe features an entity is known for can be identified. The details of one or more implementations are set forth in the accompanying drawings and the description below. Other features and advantages will be apparent from the description and drawings, and from the claims.

DESCRIPTION OF DRAWINGS

Like reference numbers and designations in the various drawings indicate like elements.

DETAILED DESCRIPTION

Documents (e.g., reviews, news articles, search logs) that relate to an entity can be collected and processed to identify candidate terms related to the entity. Some of the candidate terms can be identified as interesting representative terms by use of one or more filtering, modifying, and/or scoring techniques. Generally, the candidate terms can be processed to identify candidate terms that reveal interesting features of the particular entity within a particular category of entities or a particular location. These terms may be referred to as "known for" terms, and may list topics that the entity is often or sometimes recognized for. For example, known for terms can describe features of a restaurant (or other place) tending to distinguish it from other restaurants or from other restaurants within a particular category (e.g., Thai restaurants) or location (e.g., restaurants near the Broadway theater district). In some implementations, the described techniques can be used to semantically understand what an entity is by feeding in data that classifies particular terms as corresponding to a particular category or information (e.g., menu items, key/value attribute pairs, other data, etc.), so, at the end of the process, it is possible to understand that, e.g., that "Danny Meyer" is a chef and "soup dumplings" is a menu item and special feature of a particular hotel. The described techniques can also be used to try to understand what makes a set of terms interesting to end users. For example, identifying and showing diverse known for terms is frequently interesting to users. Once the semantics of terms associated with an entity is understood, it is possible to find an interesting overall mix of terms (e.g., showing some menu items and some details about price and ambiance) that can be used as known for terms to achieve such diversity. Different known for terms can be identified for different languages and/or the known for terms identified in one language can be translated and used as a known for term in another language. Analysis of text to identify known for terms can use different rules for different languages (e.g., based on different grammatical or usage conventions).

The known for terms can be provided to a client for display or use with the entity. For example, a restaurant may have associated known for terms "outdoor seating" and "cappuccino." A client device or process may use these known for terms to generate search results in response to a query for "outdoor seating" and "cappuccino", and/or the client may list these known for terms when displaying a profile page for the restaurant. The known for terms may also be included when displaying the restaurant name or website in a list of search result.

Figure 1:
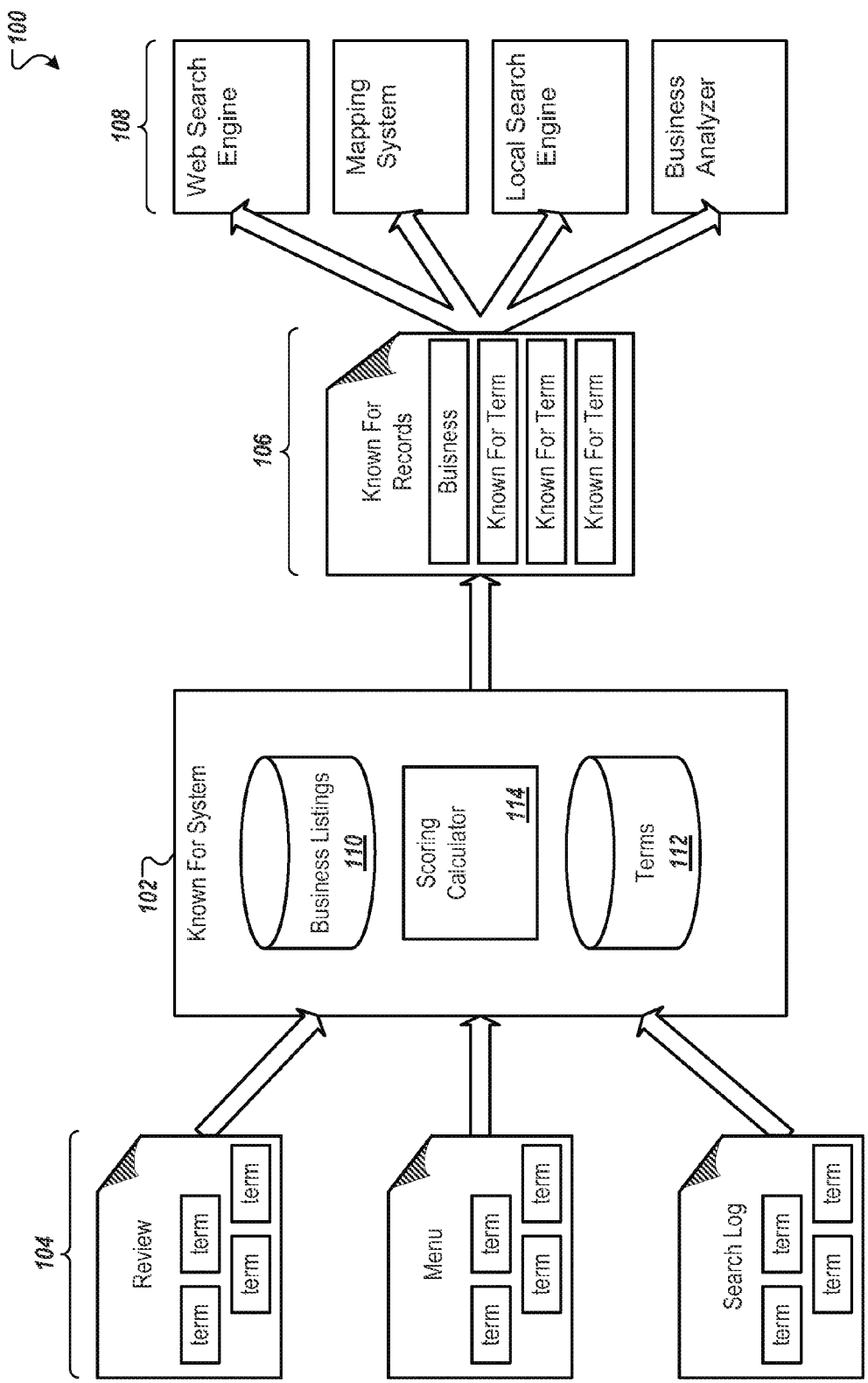
FIG. 1 is a diagram illustrating an example system for associating terms with businesses.

FIG. 1 is a diagram illustrating an example system 100 for associating terms with businesses. A "known for" term generation system 102 can retrieve documents 104 related to a particular business and generate a known for record 106 for that business. The known for record 106 can be provided to one or more clients 108. In some implementations, although only one known for record 106 is depicted in FIG. 1, multiple known for records 106 may be created for a single business. For example, for a pizzeria, one known for record 106 may be intended for general business listings. This known for record 106 may include the known for terms "restaurant," "pizza," and "Italian soda." A more specific known for record 106 may be intended for a restaurant listing, and may include the known for terms "outdoor seating," "pizza," and "Italian soda." An even more specific known for record 106 may be generated for pizza restaurants and may include the known for terms "outdoor seating," "New York-style pizza," and "family-friendly." In some cases, even within a category of pizza restaurants, a known for record 106 may be generated based on the location of the entity. For example, generation of the known for terms may eliminate the candidate term "New York-style pizza" for a pizza restaurant in New York, although it is frequently used to describe the restaurant in the documents 104, while "New York-style pizza" may be included as a known for term for a pizza restaurant in Des Moines. A determination of whether to eliminate a particular term may be based on the location of the entity, how frequently the particular term is used to describe other entities (or other entities within the same entity category) in the vicinity of the entity.

The known for system 102 can contain a data repository of business listings 110 (or listings for other places or entities). In some cases, the business listings 110 can be provided by one or more external data providers. The business listings 110 can include information about businesses such as name, street address, storefront image, hours of operations, and/or other information. The known for system 102 can retrieve documents 104 that are related to businesses in the business listings 110. An electronic document (which for brevity will simply be referred to as a document) may, but need not, correspond to a file. A document may be stored in a portion of a file that holds other documents, in a single file dedicated to the document in question, or in multiple coordinated files.

For example, for a restaurant listed in the business listings 110, the known for system 102 may analyze restaurant reviews from newspaper websites or other sources, a menu from the restaurant's website, structured or unstructured attributes from websites or data providers, and/or a search log that lists search terms that users search for before clicking on a link to the restaurant's web site (e.g., anonymized search logs). In some embodiments, other types of documents 104 identified as being related to the entity may be analyzed.

The known for system 102 can parse terms from the documents 104 and store candidate terms in a term repository 112. The known for system 102 can store a reference to the document 104 source of each term, and the business in the business listing 110 that the term is associated with. Some of the terms in the term repository 112 may be edited or removed by the known for system 102. The editing or removal may be performed based on a set of rules that identifies classes of terms that are likely to be uninteresting. For example, stop words, street addresses, email addresses, temporal terms (e.g., April), terms that relate to the name of the entity (e.g., terms that are variations of the name or title of the entity), other terms that are relatively unique to the entity, and overly broad words may be removed. For a restaurant, the term "food" may be filtered as overly broad, but not filtered for some other businesses like bowling allies or parks. Such overly broad terms can be identified based on a predetermined list of terms for a location or a category of entities to which the entity belongs and/or based on an analysis of frequency of use of terms for a location or category of entities. Additionally, the known for system 102 can edit the terms in the term repository 112. For example, terms can be identified as being typographical errors and replaced with a likely intended term (e.g., replacing "powered sugar" with "powdered sugar"). In some implementations, synonyms or sibling terms can be identified and grouped. For example, the terms "sub," "submarine," "hoagie," and "grinder" may all be identified as referring to the same general concept—a large sandwich—and all such terms may be grouped together as the same term for purposes of analyzing whether the term is a known for term. A particular term from the group (e.g., "sub") may be selected as being representative of the group (e.g., based on which term is most frequently used).

Using the terms in the term repository 112 that relate to a single business in the business listings 110, a scoring calculator 114 in the known for system 102 can calculate a score for each of the terms. The score calculation for the terms can identify meaningful terms by determining a frequency with which terms appear in documents related to the entity. Moreover, the score calculation can apply a weight to the terms by calculating how often those terms occur in documents related to all businesses of a certain type (e.g., within a category, such as an entity type category or location), and by finding terms that occur more often in documents relating to a particular business. For example, terms such as "service," "host," "dinner," may be common in documents related to restaurants in general, but "smoky," "ribs," and "barbeque" may be less common within a category of all restaurants. If the scoring calculator 114 finds many instances of "smoky," "ribs" and "barbeque" for a particular restaurant, the scoring calculator 114 can score those terms with higher values (e.g., based on a term count for each term) and can further weight the terms according to their relative frequency in documents relating to the entity compared with documents relating to other restaurants. The scoring calculator may use other factors to determine the score of each term. For example, the scoring calculator 114 may modify (e.g., boost or increase) the weight of multi-word terms, adjust the weight of terms on one or more predetermined lists of terms associated with the category (e.g., increasing the weight of terms previously identified as being of interest and/or decreasing the weight of terms previously identified as being less interesting), and may adjust the weight according to the source of the term (e.g., the type of resource in which the term appears) and/or the number of sources. For example, the weight of the term can be increased for terms that appear in reliable or popular resources (e.g., a New York Times review) and by decreasing the weight of terms that appear in less reliable resources (e.g., a blog post). In addition, the scoring calculator 114 may adjust the weight according to stored data identifying how frequently the entity is selected in response to a search that includes the term or how frequently the term is used to search within a particular corpus (e.g., to search for places within a mapping utility). Other rules for increasing the weight of candidate terms that are likely to be important descriptive terms for the entity or decreasing the weight of candidate terms that are unlikely to be important descriptive terms for the entity can also be applied. In general, a determination of whether a term is likely or unlikely to be an important descriptive term may depend on the context in which the known for terms are used. Typically, the determination will attempt to identify terms that provide information that is useful to users (e.g., not too unique or too common within a particular category or context) in distinguishing the entity from similar entities within a particular business category, location, temporal domain, or other categorization of entities.

The known for system 102 can select one or more of the terms based on the scoring (e.g., terms with the highest values) as known for terms for the restaurant. In some examples, the known for system 102 can select any term with a value above a particular threshold or a particular number of terms with the highest scores. In some cases, the set of known for terms can be selected based, at least in part, on information about the semantic meaning and/or the source of the term. For example, the set of terms can be selected to achieve a relatively diverse set of terms (e.g., for a restaurant, the system 102 may select one category term, two menu item terms, and one special feature term, instead of selecting four menu item terms even if the four menu item terms have a higher score than the category term and the special feature term) or in accordance with some other predefined criteria (e.g., favoring terms that relate to certain topics over other terms). The semantic meaning can be determined based on a candidate term being found on a list of terms having a particular meaning (e.g., a global list of known menu items), category data associated with the entity, key-value pairs in structured data, and/or using any other suitable technique.

The known for system 102 can generate a known for record 106. The known for record 106 can include a name or identifier of the entity (e.g., a business listing) and one or more of the known for terms. Clients 108 can receive the known for record 106 or terms from the known for record 106 and use the terms when, for example, displaying information about the business or processing information related to the business. One type of client 108 may be a web search engine that can consider known for terms for the business in generating search results (e.g., when users search for one of the known for terms). Another client 108 may be a mapping utility that displays business profiles. The displayed profile can include a list of the businesses known for terms, as well as information such as street address, hours of operation, etc. Other types of clients, such as local search engines and business analyzers are also possible.

Figure 2:
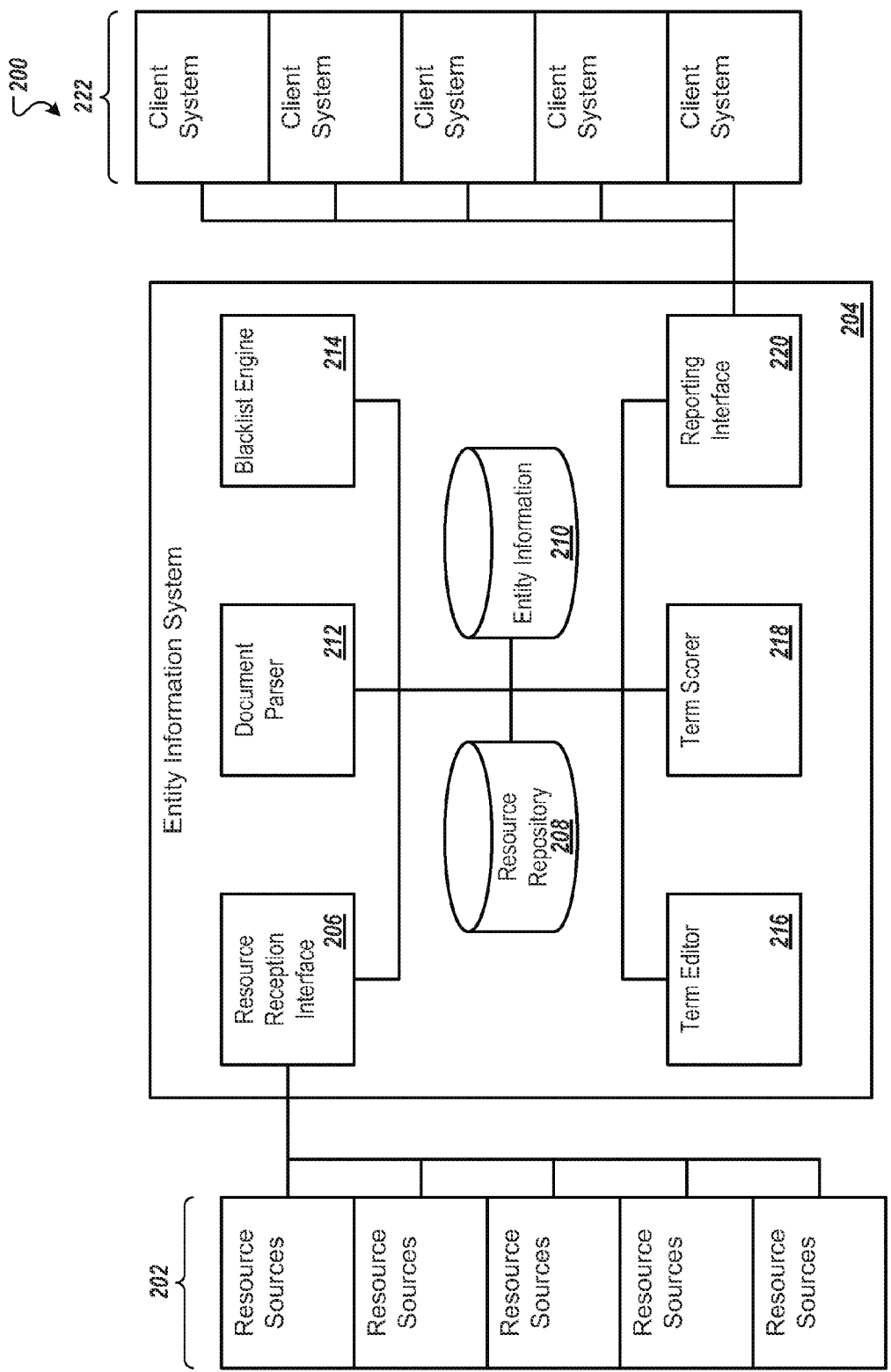
FIG. 2 shows an example system for associating data elements with an entity.

FIG. 2 shows an example system 200 for associating data elements with an entity. The entity need not necessarily be a business. In some implementations, entities can include locations, organizations, media, persons, or any other unique or identifiable place, object, or thing that may be associated with one or more terms.

Resource sources 202 can be providers of documents or other resources that include information about one or more particular entities. The resources can include, but are not limited to, websites containing reviews of the entity or text containing the entity name or links to websites associated with the entity; listings of structured or unstructured attribute data for the entity; available user feedback (e.g., comment postings on web pages); product, service, or menu listings or other terms associated with one or more categories of entities; search logs (e.g., that include data relating search terms used in searches to resources selected as a result of the searches or data relating search terms to a particular corpus or type of search system); terms identifying features of neighborhoods; and categories assigned by data providers (e.g., data aggregators). Each of the resources can include one or more terms related to the entity in the form of narrative text, link handles, category values, product names, menu items, attributes, and search terms, to name a few. The resources can be stored in one or more databases, and an entity information system 204 can access resources from the sources 202, for example across a distributed computer network (e.g., the Internet or a private network).

A resource reception interface 206 can receive the resources from the resource sources 202. In some implementations, the resource reception interface 206 can include a web crawler to scan available internet documents. In some cases, the web crawler can scan available documents for resources related to known entities. Additionally or alternatively, a resource intake engine in the resource reception interface 206 can receive, e.g., on a push or pull basis, resources from the resource sources 202. The resource reception interface 206 can store data extracted from the resources in a resource repository 208 and can associate the stored data with entities that can be cataloged in an entity information repository 210.

A document parser 212 in the entity information system 204 can parse the resources in the resource repository 208 to identify one or more candidate terms for potential association with the entity that the resource is associated with. In some implementations, the document parser 212 can create an index of candidate terms for each resource, for example to facilitate searching, manipulating, editing, and scoring the collection of candidate terms.

Some or all of the candidate terms of each resource can be modified by a blacklist engine 214 and/or a term editor 216 in the entity information system 204. Operations of the blacklist engine 214 and the term editor 216 can be specific to the language of the resource(s). A blacklist engine can access or generate a list of terms or descriptions of classes of terms—sometimes called a blacklist—that can be used to filter or remove terms in the resource repository 208 as known for term candidates. The blacklist can include category, location, and title terms (e.g., which may be generated based on information about the entity); common stop words, e.g., "and" and "the"; the name and variations of the entity and competitors or contemporaries; geographic, online and email addresses; and dates, for example. The blacklist can include terms that are blacklisted for all entities, for entities within a particular category, or for a particular entity. For example, stop words may be blacklisted for all entities, words common for a category (e.g., "food" for restaurants) may be blacklisted for generating known for terms for a particular category (although potentially not for other categories), geographic words (e.g., New York) may be blacklisted for entities within that geographic region, and title terms of variations thereof may be blacklisted for a particular entity (e.g., the name of a restaurant).

In addition to the blacklist filtering by the blacklist engine 214, the term editor 216 can modify one or more of the terms associated with a resource in the resource repository 208. The term editor 216 can identify related terms in a resource and combine them as multiple instances of the same term, including identifying both singular and plural versions of the same term, identifying substantially similar semantic variations of the same term, identifying synonym groups, and/or identifying variations that result from typographical errors. For example, the terms "football," "grid-iron" and "pigskin" may be identified as dictionary synonyms or otherwise similar, and combined in the resource repository as three instances of "football." In another example, subphrase overlap and near neighbor analysis can be used to identify similar or duplicate terms. For example, "chicken soup" and "chicken noodle soup" can be identified as similar terms and grouped by the term editor 216. The term editor 216 can also omit stop words that appear in the candidate terms.

A term scorer 218 in the entity information system 204 can compare the relative frequency of candidate terms for a particular entity with the frequency of the candidate terms in a category and/or location-based subset of a corpus of resources from the resource repository. For example, the term scorer 218 can compare the frequency of the candidate terms for the particular entity to the frequency of the same terms in resources relating to other entities in the same business category and/or location. The location can be based on an administrative division (e.g., county, city, town, or borough), a neighborhood, or an area within a threshold distance of the particular entity. In some implementations, the term scorer 218 can use a term frequency—inverse document frequency (TF-IDF) analysis to perform this comparison and can assign a TF-IDF score to each candidate term. The subset of the corpus of resources used by the term scorer 218 can be defined based on a particular information domain to which the entity belongs. For example, for an entity that is a particular brand and model of automobile, the resource corpus subset can include web documents relating to automobiles. Resource corpus subsets can be defined based on one or more parameters including category of the entity, a location of the entity, a language in which the resources are written, and/or a temporal domain (e.g., time frame, season, month of the year).

The term scorer 218 can calculate and assign a weight to the candidate terms in the resource repository 208 that are associated with one or more resources. To calculate this weight, the term scorer 218 can use the TF-IDF value in combination with other scoring data. The term scorer 218 can filter any candidate terms with a TF-IDF value below a lower TF-IDF value threshold (e.g., below a threshold relative frequency of the number of instances of the term in resources relating to the entity compared to the number of instances of the term in resources relating to entities within a selected category), for example to remove common terms in the corpus that do not apply specifically to the entity. The term scorer 218 can also filter candidate terms with a TF-IDF value above an upper TF-IDF value threshold (e.g., above a threshold relative frequency of the number of instances of the term in resources relating to the entity compared to the number of instances of the term in a corpus or in resources relating to entities within a selected category), for example to remove terms that are too unique and/or unlikely to be of interest. In some implementations, the term scorer 218 can also filter candidate terms that do not appear in a sufficient number of resources. The term scorer 218 can increase the weight of candidate terms containing two or more words, for example to promote multi-word terms that may be more interesting or descriptive than single word terms. Candidate terms found by the term scorer 218 that were previously used as part of a search query used to identify the entity (e.g., a web page associated with the entity was selected by a user in response to the user's search query) can have their weight increased. The term scorer 218 may identify such terms by examining search logs stored in the resource repository, or by receiving such a list from a resource source 202. The weight of a candidate term may be adjusted by the term scorer 218 based on the frequency of the candidate term to be used as a search term within a particular corpus (e.g., general web searching, local searching, business searching, map searching, and social network searching). For example, the weight of candidate terms that are used with more relative frequency for map or local searching than for general web searching may be increased.

In some implementations, the blacklist engine 214 and/or the term editor 216 may operate to adjust candidate term weights after the term scorer 218 assigns the candidate term weights instead of or in addition to before assigning weights. For example, the term editor 216 may identify a relation between two different candidate terms and combine the two terms as well as the weight of the candidate terms. In another example, the term editor 216 may keep both candidate terms, and may transfer some or all of the weight from one candidate term to another related candidate term. These features may also be integrated into the term scorer 218.

The blacklist engine 214 or the term editor 216 may reduce the weight or blacklist any term not found on one or more predetermined lists of terms associated with a particular subset of the corpus of the resources. For example, in a restaurant category, a list of all known or permitted menu dishes may be used, and candidate terms not found on the list may be removed by the blacklist engine 214. Alternatively, the term editor 216 may instead increase the weight of any candidate term found on list of known menu dishes and/or decrease the weight of terms not found on the list.

A reporting interface 220 can select one or more candidate terms as being representative terms for the entity based on the weights. For example, after the term scorer 218 assigns weights to the candidate terms in one or more resource, the reporting interface can select one or more of the candidate terms and assign them as representative terms for the entity for a particular information domain. In some implementations, the reporting interface 220 can select all such terms for an entity with a weight above a relevance weight threshold, or can select the n candidate terms with the highest weight. In some implementations, the reporting interface 220 can select terms based on a semantic meaning associated with at least some of the terms, to provide some degree of diversity in the selected terms, and/or in accordance with predefined criteria (e.g., criteria that attempt to ensure that one of the terms is a category term).

The reporting interface can store data identifying the selected representative terms in the entity information repository 210 and/or transmit the representative terms, along with entity information to one or more client systems or processes 222. The client systems 222 can use the entity information and representative information when performing processes that involve data about the entity and/or the representative terms. For example, a client system 222 can use the representative terms for the entity in generating search results for search queries that include the representative terms. A client system 222 can display one or more of the selected representative terms in association with displaying data identifying the entity. A client system 222 can display suggested refinements to a search query received from a user, where the suggested refinement includes or is based on the selected representative terms. A client system 222 can solicit user feedback on the entity based on the selected representative terms (e.g., to obtain feedback on features that the entity is known for). A client system 222 can group the entity with other entities that share one or more representative terms.

In some implementations, the entity information system 204 can generate multiple groups of representative terms for a single entity. For example, a plurality of subsets of the resource corpus (or different resource corpora) can be identified by the term scorer 218 (e.g., based on category, subcategory, or location data extracted by the document parser 212). Each subset may relate to a different category of entities and include resources relating to the entity. As these subsets will contain different resources, the frequency of terms and the relative importance of terms in each subset may be different.

The term scorer 218 may generate a set of weighted candidate terms for each subset, and the reporting interface can store a set of weighted candidate terms for each subset. Each set of representative terms, optionally identified by the category of the associated subset, may be made available to the client system 222, which may select one or more sets based on planned usage or context. Thus, different candidate terms can be assigned as representative terms for an entity for different categories or information domains (e.g., business type and/or location), and different representative terms can be assigned for an entity depending on the intended client (e.g., depending on client preferences). As a result, an entity can have multiple sets of representative terms for different contexts. For example, different sets of representative terms can be used to identify features the entity is known for in different categories, in different scopes of geographical area (e.g., a city or a neighborhood), in different locations (e.g., if the entity has more than one location), and/or at different times of the year.

For instance, a sport utility vehicle may have representative terms in categories for "automobiles" and "sport utility vehicles." The "automobile" representative terms may indicate features of the sport utility vehicle compared to all automobiles (e.g., powerful, heavy, reliable). The "sport utility vehicles" representative terms may indicate features of the sport utility vehicle compared only to other sport utility vehicles (e.g., good gas mileage, reliable, undersized.)

In another example, an entity may fit into two categories that are not hierarchically related. For example, an athlete turned politician may be categorized as an "athlete" and a "politician" and have assigned two sets of representative terms, one from a category of sports statistics and sports page news reports, the other from voting records and political page news reports. In this example, few or none of the terms in one group of representative terms may be in the other group.

Figure 3:
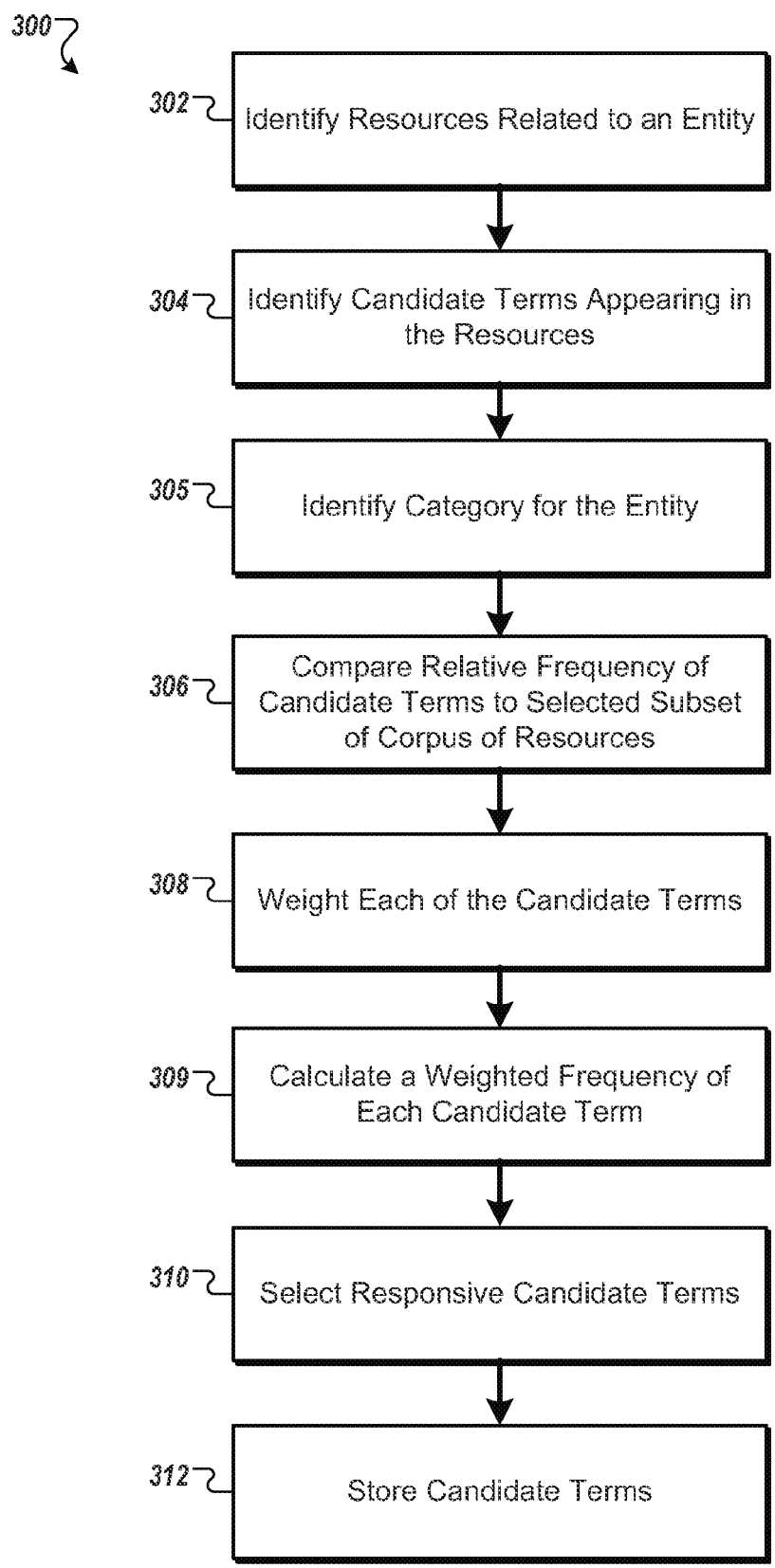
FIG. 3 is a flowchart illustrating an example process for categorizing information.

FIG. 3 is a flowchart illustrating an example process 300 for categorizing information. The information may include terms that are related to an entity, e.g., a business, location, product, person, event, or website, to name a few. In general, the process 300 can be performed using computer programs encoded on one or more computer storage media, the computer programs including instructions that, when executed by data processing apparatus, can cause the apparatus to perform various operations.

At 302, one or more resources relating to the entity are identified. Each resource includes a plurality of terms. For example, resources in a corpus of web documents and/or other documents can be received and analyzed to determine one or more entities that the files are associated with. Some resources may be examined by natural language processing and/or by analysis of metadata associated with the resource. Data relating to user interactions with a computer interface, or information received from users, customers, or survey subjects may also be used as resources.

At 304, a plurality of candidate terms that appear in the one or more resources for potentially associating with an entity are identified. Identifying the plurality of candidate terms can include identifying terms from the plurality of terms for each resource to omit from the plurality of candidate terms. For example, candidate terms in the resources may be identified by a parser configured to select single words or multiple word groups that express a single idea or concept. Some candidate terms may be substrings or partially overlap other terms. For example, a resource with the text "great scenic view" may have the three candidate terms identified: "view," "scenic view," and "great scenic view."

Some of the identified terms may be omitted from the candidate terms. Omitting candidate terms may be based on a category, location, or the particular entity. For example, predetermined lists of terms for a particular category of entities or terms that identify a location or name of the entity or contact information for the entity may be omitted. Other predetermined classes of terms (e.g., temporal terms) may be omitted. Terms may also be omitted based on the source of the resource. For example, terms from press releases or court documents that mention an entity may be omitted. Furthermore, terms may be omitted based on a list of stop words that is specific to the identified category (i.e., such that different categories have different lists of stop words).

Some identified terms may be omitted from the candidate terms by changing the term into another term or by combining statistics associated with related terms under a representative term for the related terms. For example, different candidate terms may contain different words related to the same idea or concept. Those terms may be edited to all contain the same words, for example so that the identified concepts are consistently represented. Editing of such similar terms can be based on synonym analysis, sibling term analysis (e.g., data identifying "spaghetti" as being related to "pasta"), common misspellings or typographical errors, or other known relationships between terms.

At 305, a category associated with the entity is identified. The category can be identified, for example, based on information extracted from one or more of the resources or based on category data provided by a data provider. An entity can be associated with multiple different categories, which can be independent of one another (e.g., non-hierarchical) or have varying levels of specificity (e.g., hierarchical categories and subcategories). Moreover, the categories can include business or entity type categories, location categories, and/or other ways of categorizing entities.

At 306, a relative frequency of candidate terms in the one or more resources is compared to a frequency of the candidate terms in a subset of the corpus of resources that includes resources relating to entities associated with the identified category. For example, a simple count may be made of the number of occurrences of each candidate term in the various source resources. In some implementations, this frequency may be determined by finding the number of occurrences of a candidate term in each resource, and dividing by the number of terms in the resource and then summing the result. Additionally, a frequency of the candidate term in the selected subset may be measured in the same way. A comparison of these two frequencies can be made. For example, a TF-IDF calculation can be performed to generate a TF-IDF value, or other processes may be performed to generate a comparison value.

At 308, each of the candidate terms in the one or more resources are weighted based on a source of each resource that included one or more instances of the candidate term and the relative frequency of the candidate terms in the one or more resources to the frequency of the candidate terms in the selected subset of resources. For example, a greater weight can be assigned to candidate terms that appear in certain types of resources or that come from particular sources. In addition, assigning weights based on the relative frequency can be performed to assign a greater weight to candidate terms that appear with greater relative frequency in the one or more resources than in the identified subset of resources and a lesser weight (or elimination) of terms that appear with lesser relative frequency (i.e., which may be indicative that the term is relatively common for the particular category). Assigning weights based on frequency can also be based on the number of sources that include the candidate term (e.g., assigning a greater—or lesser—weight to a candidate term that appears in a large number of different resources or different sources relative to a candidate term that includes the same total number of appearances but that appears in a smaller number of different resources or resource sources). Other factors may be used to calculate a term weight. Factors that are found, for example through empirical or analytical study, to be correlated with useful representative terms may be used to increase the weight assigned to candidate terms, and factors shown to be correlated with unusual representative terms may be used to decrease the weight assigned to candidate terms. One factor that may be shown to be correlated with useful representative terms may be word count in a term. Candidate terms with multiple words may have their weight increased.

At 309, a weighted frequency of each candidate term is calculated. The weighted frequency can be calculated based on the weights and on a number of instances of the candidate term in the resources. The total number of instances of the term in the resources or the number of separate resources that include the term (or some weighted combination thereof) can be used. The weights can be applied to the individual instances and/or after during or after calculating the number of instances. For example, some weights (e.g., based on source) can be applied to the individual instances, while other weights (e.g., based on relative frequency) can be applied after summing the number (or partially weighted number) of instances. In addition, the weighted frequency can also account for groups of related terms, e.g., by combining the weighted counts of instances of related terms, linearly or otherwise. A particular term of the group of related terms can be selected as representative for the group, and the combined weighted frequency of the related terms can be associated with the representative term.

At 310, one or more candidate terms are selected as being representative terms for the entity based on the weighted frequencies. For example, one or more of the candidate terms with the highest weighted frequencies may be selected as representative terms. In some implementations, the selected terms may be referred to as "known for terms." The number of terms selected may be configured according to different parameters. For example, a particular number of candidate terms with the highest weighted frequency may be selected; all terms with a weighted frequency above a threshold may be selected; or a standard deviation of all weighted frequencies associated with an entity may be determined, and terms within one standard deviation of the highest weight (or a fraction thereof) may be selected. Typically, the weights and/or elimination of predetermined classes of terms as candidates can be used to avoid selecting terms that are not representative of features the entity is known for. Weights and/or rules for eliminating terms can be tuned to improve performance of the process 300 to avoid selecting undesirable terms.

At 312, data identifying the selected representative terms as being associated with the entity is stored for the entity. For example, the representative terms, or reference to the terms in a storage system, and a description of the entity, or reference to the description of the entity in a storage system, may be stored in a computer storage medium and/or provided to a computer system.

Figure 4:
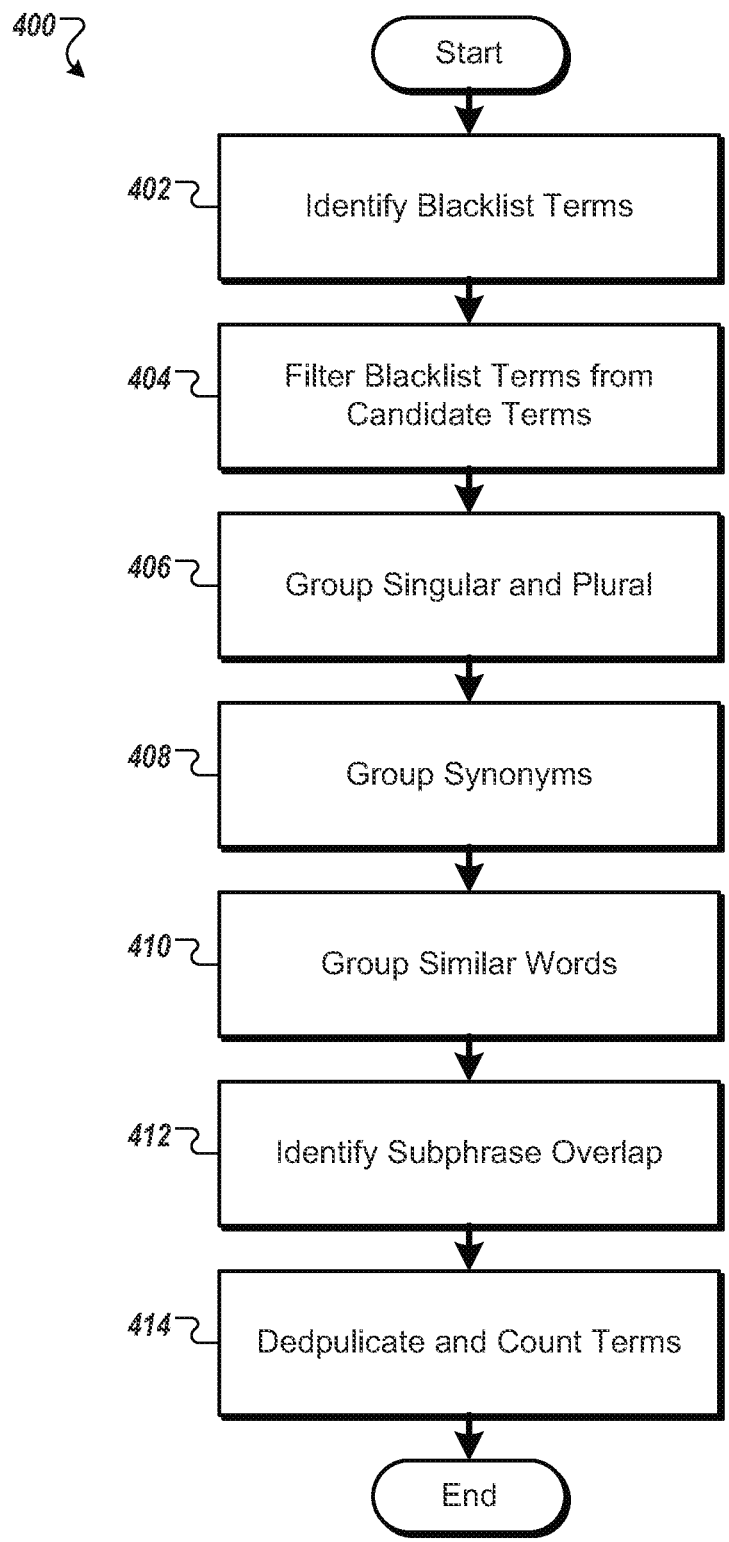
FIG. 4 is a flowchart illustrating an example process for identifying a plurality of candidate terms for potentially associating with an entity.

FIG. 4 is a flowchart illustrating an example process 400 for identifying a plurality of candidate terms for potentially associating with an entity. The process 400 may be performed, for example, at 304 in the process 300, although operations within the process 400 may also be performed at other points within the overall sequence of process 300. Although one process for identifying candidate terms is described here, it will be understood that other processes can also be used. In general, the process 400 can be performed using a computer program encoded in a computer storage medium, the computer program including instructions that, when executed by a data processing apparatus, can cause the apparatus to perform various operations.

At 402, a blacklist of terms is identified. For example, an explicit list of terms (e.g, examplename@exampledomain.com) or a list of rules (e.g., any email address) may be generated, imported, compiled, or otherwise identified. The blacklist may include entries particular to a specific category of entities (e.g., to avoid overly broad terms, such as "food" for restaurants,) and may include universal entries (e.g., stop words.)

At 404, blacklist terms are filtered from candidate terms. For example, all candidate terms for one or more resources may be stored in a data structure separate from the resource itself. All candidate terms matching the terms on the black list (in some cases, including synonyms, related terms, etc.) may be deleted from the data structure so that only non-blacklisted terms appear in the candidate term data structure.

At 406, candidate terms containing singular and plural versions of the same word or words may be grouped together. For example, many words, in either singular or plural form, may express the same idea. A review of a museum discussing "paintings" and later discussing "a painting" may be considered to be discussing the same subject.

At term 408, candidate terms containing synonyms may be grouped together for purposes of analysis. For example, an author of a resource may utilize synonyms to refer to the same idea in resource to avoid monotony. Similarly, at 410, candidate terms with similar words may be grouped. Some words may indicate the same idea, even if they are not synonyms. For example, "laptop," "desktop," and "server" are not synonyms, but for the purposes of listing the types of devices a service shop can repair, they may be the same. Additionally, geographically related candidate terms may be considered similar and grouped. For example, Ellis Island and the Statue of Liberty may be considered similar and grouped together.

At 412, subphrase overlap of words or tokens (e.g., Kanji characters or acronyms) in candidate terms may be identified. Candidate terms which share one or more words or tokens, optionally in order, may be said to have subphrase overlap. For example "resort and water park" and "water park" share the words "water park." A count of terms in a resource containing "resort and water park" in one sentence and "water park" in another sentence may result in a count of two instances of "water park" and one instance of "resort and water park." In some implementations, by grouping these two terms together, a count of two instances of the same idea may be made. Similarly, semantic overlap can also be identified and used to combine counts of phrases, words, or other tokens. In some languages (e.g., Chinese, Japanese, or Korean), overlap of tokens may require additional semantic analysis to segment the characters into component concepts.

When identifying and grouping related terms together, the related terms can be replaced in the set of candidate terms with a selected one of the terms from the group, and the frequency statistics and the like associated with the eliminated variations can be attributed to the selected term. In some implementations, the term that is selected as representative of the group can be based on which term appears with the greatest frequency in association with the entity. For example, if the term "resort and water park" appears once in a document and "water park" appears twice, the terms may be grouped based on the subphrase overlap and the latter term may be selected as the representative term for the group. In most cases, the count of the number of instances will only be combined if the instances are unique. Here, if one of the instances of "water park" was within the instance of "resort and water park," the total count would still be two. Other situations (e.g., where the instances of terms in the group are all unique) may result in combining counts linearly or in some other manner.

At 414, duplicate terms are counted and duplicates can be removed. For example, for each grouped candidate term, a count of the number of instances of the candidate term is made, and the copies of the candidate term may be deleted from a data structure storing the candidate terms.

Figure 5:
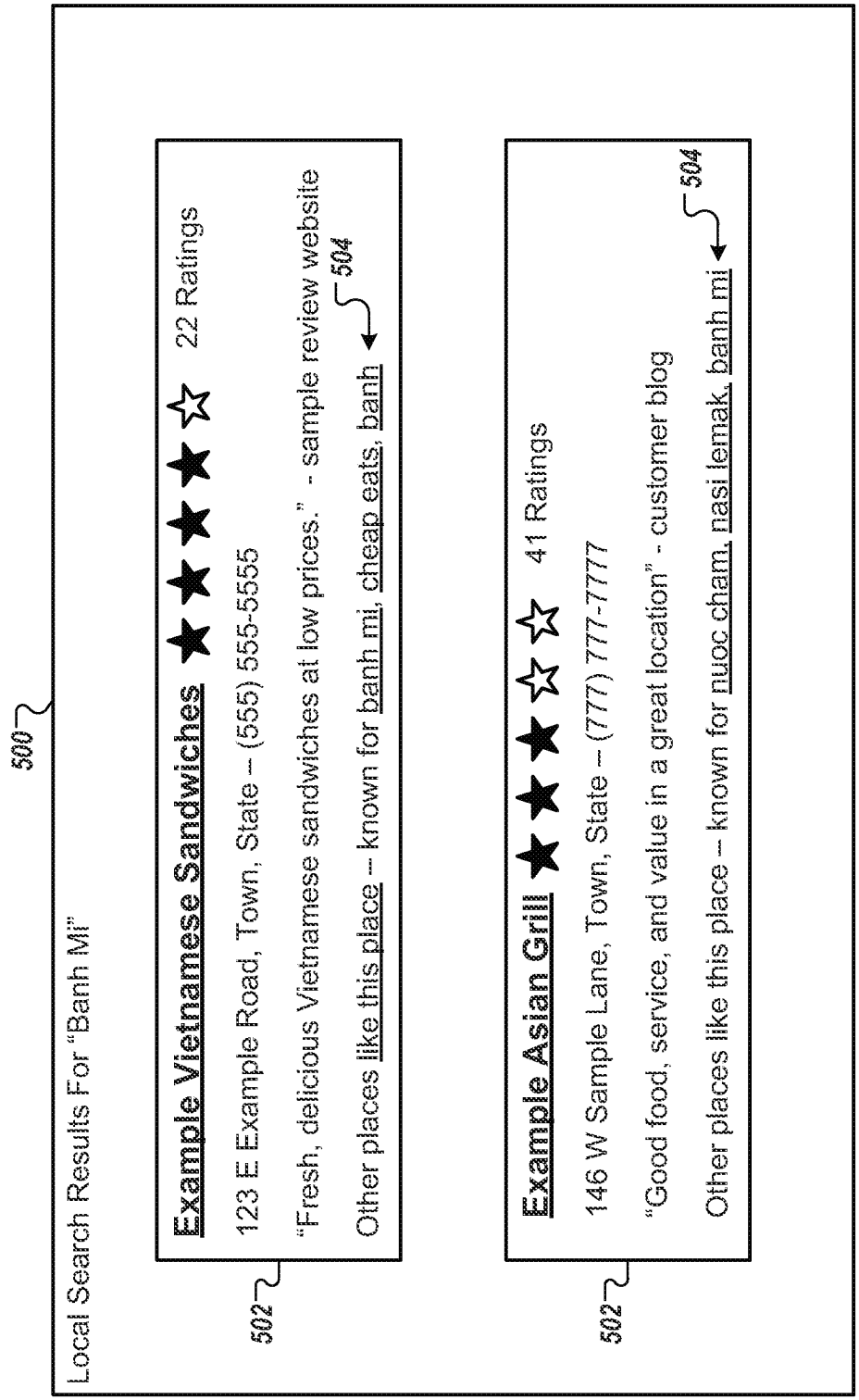
FIG. 5 is an illustration of a graphical user interface for displaying local search results with representative terms.

FIG. 5 is an illustration of a graphical user interface (GUI) 500 for displaying local search results with representative terms. The GUI 500 may be rendered by a client computer running a web browser using one or more files served by a local search engine. The GUI 500 may be an element of a webpage served by the local search engine in response to a local search request from the client computer for "Banh Mi."

Location listings 502 may contain information about results of the search query. In the example shown, two search results ("Example Vietnamese Sandwiches" and "Example Asian Grill") are returned by the search engine. Each search result is displayed with related information (address, star rating, etc.) and a list of representative terms 504. The representative terms 504 can include an embedded hyperlink that, when selected by the user of the web browser, can transmit to the search engine instructions to perform a local search for that representative term.

For example, the GUI 500 may enable a user to quickly identify features that the search result is known for—by reading the representative terms 504—and to search for similar restaurants—by clicking on the representative terms 504.

Figure 6:
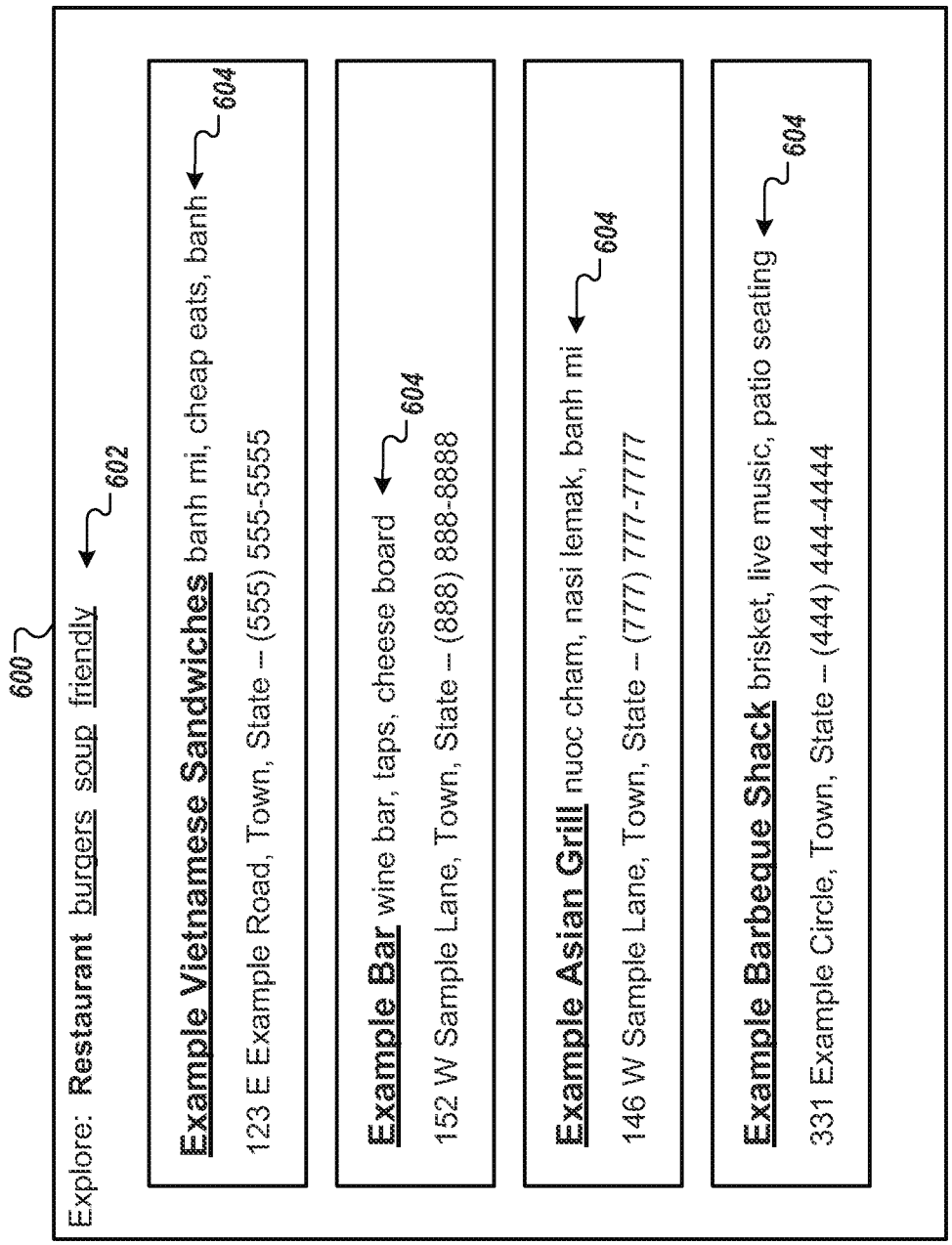
FIG. 6 is an illustration of a graphical user interface for displaying entities that share a representative term.

FIG. 6 is an illustration of a graphical user interface (GUI) 600 for displaying entities that share a representative term. The GUI 600 may be rendered by a client computer running a web browser using one or more files served by a business listing service.

Category listing 602 can list the category of businesses listed in the GUI 600 or stored by the business listing service for a particular geographical area. In the illustrated example, the user is browsing the category "Restaurant," and a summary of restaurants is displayed. Additionally, the category listing 602 can include a list of popular, interesting, or randomly chosen representative terms associated with businesses in the category listing 602. The representative terms can include an embedded hyperlink that, when selected by the user of the web browser, can transmit to the search engine instructions to display restaurant entries with the selected representative term.

In each restaurant summary, a list of representative terms 604 is displayed after the name of the restaurant. In some implementations, this listing can provide to a reader a quick summary of interesting, unique, or useful ideas for which each entry is known.

Figure 7:
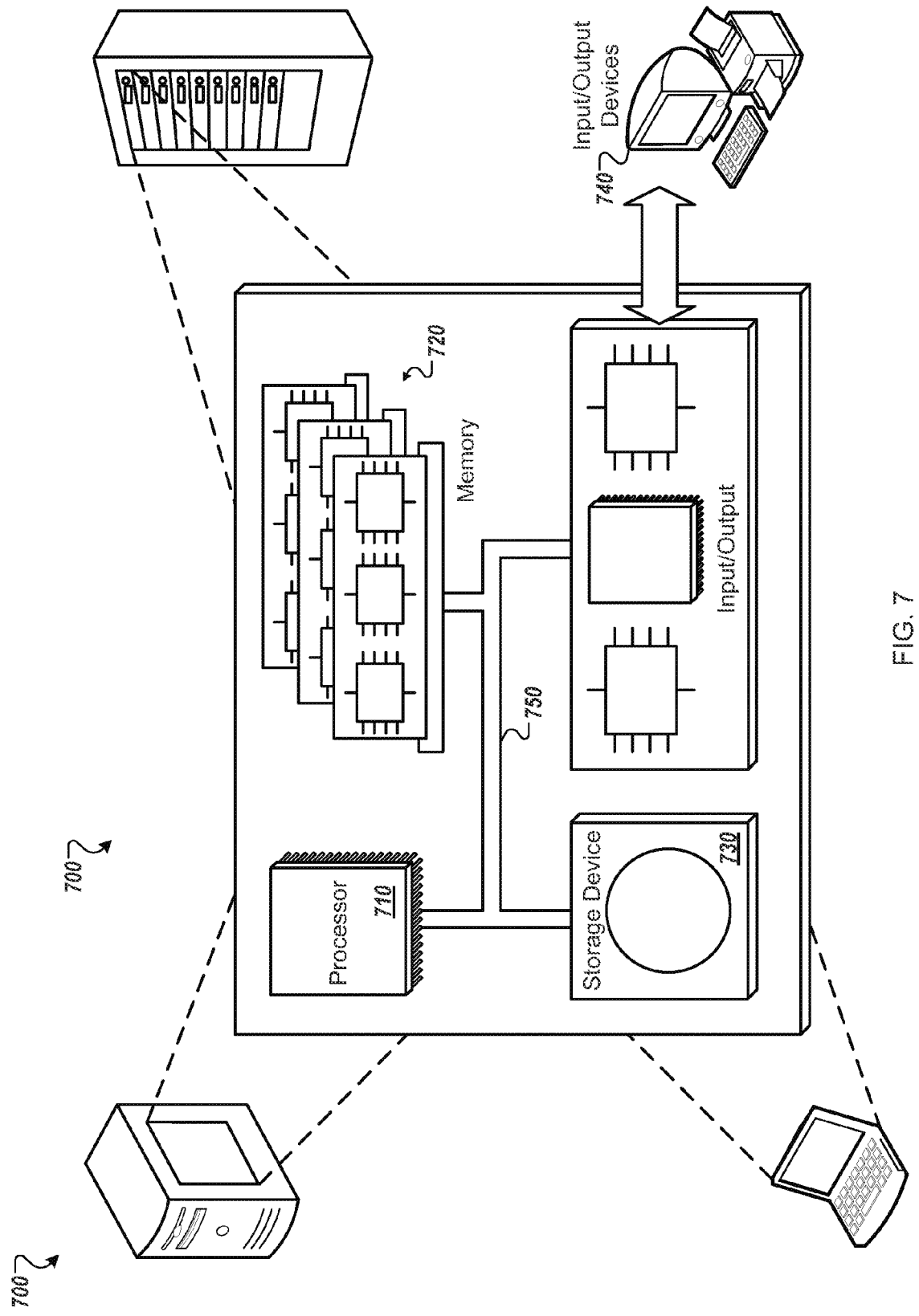
FIG. 7 is a schematic diagram that shows an example of a computing system that can be used in connection with computer-implemented methods and systems described in this document.

FIG. 7 is a schematic diagram that shows an example of a computing system 700. The computing system 700 can be used for the operations described in association with any of the computer-implement methods and systems described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Structures and processes described in this document may be performed on separate computer systems that may be geographically separated and communicably coupled. For example, some elements of the resource reception interface 206 may be executed on processors 710 located in various network connected servers in datacenters across the Earth, and may communicate and report to other elements of the resource reception interface 206 or any portion of the computer system 200 implemented in other network connected servers. Similarly, data created and stored by structures and processes may be distributed and replicated across multiple storage devices 730 that may be geographically local or remote to computer system that generate the data.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for determining characteristic terms for an entity, the method comprising:
   identifying one or more resources relating to the entity, each resource including a plurality of terms;
   identifying a plurality of candidate terms from the plurality of terms;
   identifying a business type associated with the entity;
   identifying one or more resources associated with other entities having the same business type;
   determining, via one or more processors and for each of the plurality of candidate terms:
   a first frequency with which the candidate term appears in the one or more resources related to the entity;
   a second frequency with which the candidate term appears in the one or more resources associated with other entities in the identified business type;
   a relative frequency for the candidate term based on the first frequency and the second frequency; and
   a weighted relative frequency for the candidate term based on the relative frequency of the candidate term and how frequently the entity is selected as a search result when presented in response to a search query that includes the candidate term;
   identifying, via one or more processors, one or more of the candidate terms as characteristic terms for the entity based on the weighted relative frequency of each candidate term; and
   associating the identified characteristic terms with the entity in a data repository.

2. The method of claim 1 further comprising:
   identifying, for at least a first candidate term, a set of related candidate terms, and determining the first and second frequencies and the weighted relative frequency for the first candidate term based on the set of related candidate terms.

3. The method of claim 2 wherein the set of related candidate terms includes a term that is at least one of:
a plural of the first candidate term;
a substantially similar semantic variation of the first candidate term;
a synonym of the first candidate term; or
a subphrase of the first candidate term.

4. The method of claim 1 wherein identifying the plurality of candidate terms includes omitting, from the plurality of terms in the one or more resources related to the entity, a predefined set of stop words.

5. The method of claim 1 wherein identifying the plurality of candidate terms includes omitting, from the plurality of terms in the one or more resources related to the entity, terms that fall within one or more predefined classes of terms.

6. The method of claim 1 wherein identifying the plurality of candidate terms includes omitting from the plurality of terms in the one or more resources related to the entity one or more of:
terms that refer to a location of the entity;
terms that are variations of a name of the entity;
contact information associated with the entity;
terms included in a list of stop words associated with the business type associated with the entity;
terms that are common in documents associated with the determined business type; or
temporal terms.

7. The method of claim 1 wherein identifying the business type for the entity and identifying one or more resources associated with entities having the same business type comprises determining the location of the entity and identifying one or more resources associated with entities within a particular geographical area near the location of the entity.

8. The method of claim 1 wherein identifying the business type for the entity and identifying one or more resources associated with entities having the same business type comprises determining a business category for the entity and identifying one or more resources associated with entities having a same business category as the entity.

9. The method of claim 8 further comprising:
identifying a second business category associated with the entity;
identifying one or more resources associated with other entities in the second business category;
determining, via one or more processors and for each of the plurality of candidate terms:
a third frequency with which the candidate term appears in the one or more resources associated with other entities in the second business category;
a second relative frequency for the candidate term based on the first frequency and the third frequency; and
a weighted second relative frequency for the candidate term based on the second relative frequency of the candidate term and how frequently the entity is selected as a search result when presented in response to a search query that includes the candidate term;
identifying, via one or more processors, one or more of the candidate terms as characteristic terms for the entity in the second business category based on the weighted second relative frequency of each candidate term; and
associating the identified characteristic terms with the entity and the second business category in a data repository.

10. The method of claim 1 wherein the plurality of resources include one or more of:
web documents relating to the entity;
a database storing attributes associated with the entity;
a database storing terms used to search for a web document relating to the entity;
a database storing terms identifying features of neighborhoods; or
a database storing terms associated with the identified business type.

11. The method of claim 1 wherein identifying, via one or more processors, one or more of the candidate terms as characteristic terms for the entity based on the weighted relative frequency of each candidate term, further comprises:
filtering candidate terms with a weighted relative frequency that is less than a threshold.

12. The method of claim 1 wherein identifying the plurality of candidate terms further includes identifying terms in the one or more resources relating to the entity that appear in a predetermined list of terms associated with the determined business type.

13. The method of claim 1 further comprising one or more of:
using the characteristic terms for the entity to generate search results for search queries that include the characteristic terms;
displaying one or more of the characteristic terms in association with displaying data identifying the entity;
displaying suggested refinements to a search query received from a user;
generating a set of characteristic terms for a geographical area that includes the entity from the characteristic terms for the entity;
soliciting user feedback on the entity based on the characteristic terms; or
grouping the entity with other entities that share one or more characteristic terms.

14. A computer storage medium encoded with a computer program, the program comprising instructions that when executed by data processing apparatus cause the data processing apparatus to perform operations including:
identifying a set of candidate terms for potentially associating with an entity, wherein the set of candidate terms are included within one or more resources relating to the entity;
identifying at least one of an entity type category for the entity or an entity location of the entity;
determining a first frequency with which each of the candidate terms appears in the one or more resources relating to the entity;
determining a second frequency with which each of the candidate terms appears in one or more resources relating to the identified entity type category or the identified entity location;
determining a relative frequency for each of the candidate terms based on the first frequency and the second frequency;
determining a weighted relative frequency for each of the candidate terms based on the relative frequency of each candidate term and how frequently the entity is selected as a search result when presented in response to a respective search query that includes each candidate term;
selecting one or more candidate terms as being characteristic terms for the entity based at least in part on the determined weighted relative frequency of each candidate term; and
storing data identifying the selected characteristic terms for the entity as being associated with the entity.

15. The computer storage medium of claim 14 wherein the instructions to cause the data processing apparatus to select one or more candidate terms as characteristic terms for the entity further comprise instructions to cause the data processing apparatus to eliminate one or more candidate terms having a weighted relative frequency that falls below a threshold.

16. A system comprising:
one or more memories storing instructions; and
one or more processors configured to execute the instructions stored in the one or more memories in order to:
identify a set of candidate terms for potentially associating with an entity, wherein the set of candidate terms are included within one or more resources that include information about the entity; and
identify at least one of an entity type category for the entity or an entity location of the entity;
determine a first frequency with which each of the candidate terms appears in the one or more resources relating to the entity;
determine a second frequency with which each of the candidate terms appears in one or more resources relating to the identified entity type category or the identified entity location;
determine a relative frequency for each of the candidate terms based on the first frequency and the second frequency;
determine a weighted relative frequency for each of the candidate terms based on the relative frequency of each candidate term and how frequently the entity is selected as a search result when presented in response to a respective search query that includes each candidate term;
select one or more candidate terms as being characteristic terms for the entity based on the weighted relative frequency of each candidate term; and
store data associating the characteristic terms with information about the entity in a data repository.

17. The system of claim 16 wherein the one or more processors are configured to select one or more candidate terms as characteristic terms for the entity by eliminating one or more candidate terms having a weighted relative frequency that is less than a threshold.

18. The system of claim 16 wherein the one or more processors are further configured to eliminate from the set of candidate terms at least one of:
candidate terms describing a location of the entity;
candidate terms relating to a name of the entity; or
candidate terms in a predefined list of terms associated with at least one of the entity type category or the entity location.

* * * * *